E. S. PIERCE.
Tool for Cutting Screw Threads.
No. 3,940. Reissued April 26, 1870.
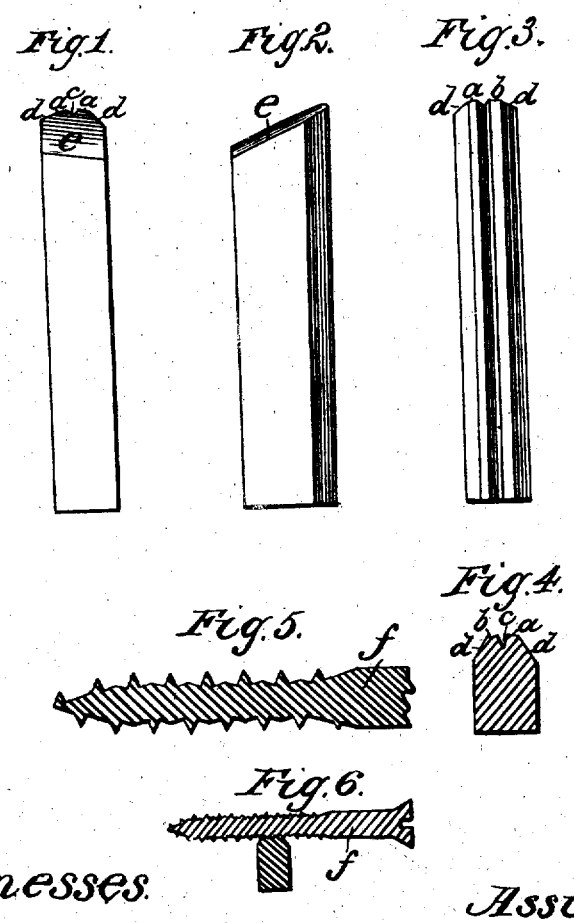
Witnesses.
Jeremy W. Bliss.
Alfred Wattenson
Assignees.
The National Screw Co.
by Geo. Clark
President

United States Patent Office.

THE NATIONAL SCREW COMPANY, OF HARTFORD, CONNECTICUT, ASSIGNEES OF ELIJAH S. PIERCE.

*Letters Patent No.* 87,198, *dated February* 23, 1869; *reissue No.* 3,940, *dated April* 26, 1870.

DIVISION A.

IMPROVED TOOL FOR CUTTING SCREW-THREADS.

The Schedule referred to in these Letters Patent and making part of the same

*To all whom it may concern:*

Be it known that ELIJAH S. PIERCE did invent a certain new and useful Improvement in Tool for Cutting Screws; and, to enable others skilled in the art to make and use the same, we, THE NATIONAL SCREW COMPANY, of the city and county of Hartford and State of Connecticut, assignees of the said ELIJAH S. PIERCE, will proceed to describe its construction and advantage, referring to the drawings, in which the same letters indicate like parts in each of the figures.

The first part of the nature of this invention consists of a tool which has two inclined cutting-edges, for forming the bottom of the groove between the threads, so as to give the ends of the core, at the commencement of the thread, and at the point of the screw, a conical form, and the intermediate part the form of a low supplemental thread between the convolutions of the principal thread, as shown in fig. 5.

In the accompanying drawings—

Figure 1 is a back view of this tool.

Figure 2 is a front view.

Figure 3 is a front view.

Figure 4 is a cross-section of the same.

Figure 5 is a longitudinal section of a screw, on an enlarged scale, cut by this improved tool.

Figure 6 shows a horizontal section of the screw, and the position of the tool while cutting the thread.

The tool is a straight steel bar of the cross-section shown in fig. 4, having its extremity *e* ground off to the proper angle back from the edges *a* and *b*, to form a cutting-tool, and to such lateral angle that, when the tool is in use, and held to the blank in a direction corresponding to the pitch of the thread, the plane of the said extremity shall lie parallel to the longitudinal axis of the blank.

The sides of the groove *c* and the outside edges *d d* form the thread, and the edges *a* and *b* the bottom of the groove.

The tool is held to the blank in such position that the direction of the groove *c* shall correspond to the direction or pitch of the thread, and is moved forward against and laterally along the screw-blank in the manner usual in screw-cutting and threading machines.

When the tool first enters the screw at *m*, fig. 5, the edges *a* and *b* commence to cut, and *a*, following *b*, forms the conical part of the core to *n*, or so long as the tool is advanced toward the axis of the screw, after which the edge *b* also cuts part of the bottom of the groove, and the two finish the central core from *n* to *o*, in the form shown in fig. 5.

From *o* to *p* the tool is again advanced, and the edge *a* finishes the conical portion of the core.

The advantages of this invention are, that it cuts a screw with a conical point to the core, and a supplemental thread along the cylindrical portion *n o*, whereby the screw is made to enter more easily, and hold more firmly, than when the bottom of the groove is of a volute form at the ends of the thread, and cylindrical in the middle.

What we claim, and desire to secure by Letters Patent, is—

The improved double tool for cutting screws, constructed substantially as herein described.

THE NATIONAL SCREW CO., [L. S.]
By EZRA CLARK, *President.*

Witnesses:
ALFRED WATKINSON,
JEREMY W. BLISS.